(12) United States Patent
Fray et al.

(10) Patent No.: US 10,106,899 B2
(45) Date of Patent: Oct. 23, 2018

(54) OXYGEN GENERATION APPARATUS AND METHOD

(71) Applicant: CAMBRIDGE ENTERPRISE LIMITED, Cambridge (GB)

(72) Inventors: Derek John Fray, Cambridge (GB); Vega Petrova Kotzeva, Cambridge (GB)

(73) Assignee: Cambridge Enterprise Limited, Cambridge (GB)

( * ) Notice: Subject to any disclaimer, the term of this patent is extended or adjusted under 35 U.S.C. 154(b) by 427 days.

(21) Appl. No.: 14/669,922

(22) Filed: Mar. 26, 2015

(65) Prior Publication Data

US 2015/0197865 A1    Jul. 16, 2015

Related U.S. Application Data

(63) Continuation of application No. 11/817,519, filed as application No. PCT/GB2006/000761 on Mar. 3, 2006, now abandoned.

(30) Foreign Application Priority Data

Mar. 3, 2005 (GB) .................................. 0504445.8

(51) Int. Cl.
    *C25B 1/10*      (2006.01)
    *C25B 9/08*      (2006.01)
    (Continued)

(52) U.S. Cl.
    CPC .................. *C25B 1/10* (2013.01); *C25B 9/08* (2013.01); *C25B 9/10* (2013.01); *C25B 15/08* (2013.01); *Y02E 60/366* (2013.01)

(58) Field of Classification Search
    CPC ........... C25B 15/08; C25B 15/02; C25B 1/10; C25B 1/04
    See application file for complete search history.

(56) References Cited

U.S. PATENT DOCUMENTS 3,410,783 A    11/1968  Tomter
3,744,491 A    7/1973   Fischer
(Continued)

FOREIGN PATENT DOCUMENTS

CA    1198710 A    12/1985
JP    07213848 A    8/1995
(Continued)

OTHER PUBLICATIONS

"Tiny Oxygen Concentrator Called Big Deal," Jim Sullivan, HME News, 2 pages, May 31, 2004.
(Continued)

*Primary Examiner* — Brian W Cohen

(57) ABSTRACT

An oxygen generator for an oxygen-generation apparatus has a proton-conducting membrane, a cathode contacting a first side, or cathodic side, of the membrane, an anode contacting a second side, or anodic side, of the membrane, and a source of water for supply to the membrane. In use, an electrolysis voltage applied between the cathode and the anode causes electrolysis of the water to generate oxygen gas at the anode. Atmospheric oxygen, i.e. oxygen in the air, is substantially prevented from coming into contact with the cathode. For an acidic proton-conducting membrane this substantially prevents the formation of hydrogen peroxide at the cathode.

15 Claims, 8 Drawing Sheets

(51) Int. Cl.
*C25B 9/10* (2006.01)
*C25B 15/08* (2006.01)

(56) References Cited

U.S. PATENT DOCUMENTS

| | | | |
|---|---|---|---|
| 3,888,749 | A | 6/1975 | Chong |
| 4,003,371 | A | 1/1977 | Fischer |
| 4,475,994 | A | 10/1984 | Gagne |
| 4,486,276 | A | 12/1984 | Cohn |
| 4,839,247 | A | 6/1989 | Levy |
| 4,859,296 | A | 8/1989 | Marianoswki |
| 4,908,113 | A | 3/1990 | Marianowski |
| 5,154,697 | A | 10/1992 | Loori |
| 5,338,412 | A | 8/1994 | Burk |
| 5,478,310 | A | 12/1995 | Dyson-Cantwell |
| 5,480,518 | A | 1/1996 | Shane |
| 5,578,022 | A | 11/1996 | Scherson |
| 5,788,682 | A | 8/1998 | Maget |
| 5,855,570 | A | 1/1999 | Scherson |
| 5,916,505 | A | 6/1999 | Cisar |
| 6,368,592 | B1 | 4/2002 | Colton |
| 6,368,740 | B1 | 4/2002 | Dristy |
| 6,803,137 | B2 | 10/2004 | Ito |
| 7,504,015 | B2 | 3/2009 | Hecker |
| 2004/0040862 | A1 | 3/2004 | Kosek |

FOREIGN PATENT DOCUMENTS

| | | |
|---|---|---|
| JP | 9157876 A | 6/1997 |
| WO | 03049660 A1 | 6/2003 |
| WO | 06092612 A2 | 9/2006 |
| WO | 08138048 A1 | 11/2008 |

OTHER PUBLICATIONS

"FDA Clears EpiFLO for Chronic Non-Healing Wounds: Tiny Portable Device Delivers Healing Oxygen 24 Hours/Day," Burk et al., Ogenix Corporation Press Release, Oct. 26, 2004, 3 pages.

"Portable Electrochemical Oxygen Concentrators (PECOC) for Healthcare and PEMFC," Mel Burk, FreshAire Systems & Technologies, Inc., Oct. 2001, 10 pages.

"Local Man's Oxygen Device Able to Heal Chronic Wounds," Business Cleveland.Com, Apr. 16, 2004, 2 pages.

Nafion—Perfluorosulfonate Ionomer, Mauritz Nafion Research, pp. 1-3, www.psrc.usm.edu/mauritz/nafion.html, Sep. 20, 2007.

OXYGEN GENERATION APPARATUS AND METHOD

CROSS-REFERENCE TO RELATED APPLICATIONS

This application is a continuation of U.S. patent application Ser. No. 11/817,519, filed on Jul. 8, 2008, which claims the benefits from priority of International Application Serial No. PCT/GB2006/000761, filed Mar. 3, 2006, which claim the benefits from priority of Great Britain Application No. 0504445.8, filed Mar. 3, 2005, the disclosures of which are incorporated herein by reference in their entirety.

The invention relates to an oxygen generation apparatus and a method of generating oxygen. In particular, it is concerned with the generation of oxygen for use in the treatment of wounds and sores. However, it will be clear to those skilled in the art that the invention also has many other applications requiring oxygen or hydrogen generation. However, it will be clear to those skilled in the art that the invention also has many other applications requiring oxygen or hydrogen generation.

There is evidence in the literature that the supply of oxygen to a wound site can promote the healing of the wound. This applies to both humans and animals. Topical oxygen therapy, as it is known, encourages the growth of fresh skin tissue to close and heal wounds. It is believed that oxygen dissolves in tissue fluids and improves the oxygen content of the intercellular fluids.

Various methods have been described for the supply of oxygen to wounds. In some instances, the affected limb is placed in a chamber (U.S. Pat. Nos. 4,003,371 and 3,744,491) or a bag (U.S. Pat. Nos. 5,154,697 and 5,478,310) of oxygen that is fed from an oxygen cylinder. This approach is impractical for many patients as it restricts the mobility of the patient and necessitates the use of control valves to control the flow of oxygen. Furthermore, when healthy skin is exposed to gasses containing high concentrations of oxygen, it is possible that vasoconstriction and tissue destruction may occur.

In an alternative approach, U.S. Pat. Nos. 5,578,022, 5,788,682 and 5,855,570 describe devices that are incorporated into or above bandages that are placed over the wound. The oxygen is produced electrochemically by ionisation of the oxygen in the air at a cathode to form hydrogen peroxide that dissolves in a proton-conducting membrane adjacent the cathode. The hydrogen peroxide diffuses through the membrane to an anode where the hydrogen peroxide is decomposed to form water and pure oxygen that is transmitted to the wound.

The presence of hydrogen peroxide is not welcomed by physicians as it can kill healthy cells. It is desirable to be able to produce pure oxygen for healing of wounds without the use of a hydrogen peroxide intermediate. Unfortunately, all known proton-conducting membranes are highly acidic and under these conditions hydrogen peroxide is formed when oxygen is ionised at a cathode.

SUMMARY OF INVENTION

The invention provides an oxygen generation apparatus, a catalytic apparatus, a method of reducing hydrogen venting, a method of generating oxygen, and a method of supplying water as defined in the appended independent claims, to which reference should now be made. Preferred or advantageous features of the invention are defined in dependent sub-claims.

An oxygen generator for an oxygen-generation apparatus according to the invention comprises a proton-conducting membrane, a cathode contacting a first side, or cathodic side, of the membrane, an anode contacting a second side, or anodic side, of the membrane, and a source of water for supply to the membrane. In use, an electrolysis voltage applied between the cathode and the anode causes electrolysis of the water to generate oxygen gas at the anode. Atmospheric oxygen, i.e. oxygen in the air, is substantially prevented from coming into contact with the cathode. For an acidic proton-conducting membrane this may substantially prevent the formation of hydrogen peroxide at the cathode.

The use of a proton-conducting membrane as an electrolyte is known from fuel-cell technology. One example of a suitable proton-conducting membrane is Dupont Nafion®, a perfluorosulfonate polymer that is highly permeable to water.

Water may be supplied to the proton-conducting membrane at its anodic side, i.e. the side of the membrane contacting the anode. If this is the case, dissociation of water takes place at the anode and protons migrate to the cathode, where they are discharged as hydrogen, and oxygen is discharged at the anode. In such a case the evolved oxygen may contain a larger proportion of water than in the alternative embodiments described below and oxygen may need to be separated from this water before use. The hydrogen discharged at the cathode may contain liquid water, due to hydration of the migrating proton, and this may need to be separated from it if the hydrogen is to be used.

Water may be supplied to the proton-conducting membrane at its cathodic side, i.e. the side of the membrane contacting the cathode. In this case water diffuses through the membrane, for example controlled by a concentration gradient. Hydrated hydrogen ions may migrate through the membrane due to the electro-osmotic flux proportional with the cell current. Oxygen produced by electrolysis of the water at the anode may advantageously be substantially free of water or contain a lower level of water vapour, unless water is also simultaneously being supplied on the anodic side of the membrane.

In a preferred embodiment water may, advantageously, be supplied to the proton-conducting membrane from an edge or edges of the membrane. Water supplied in such a way may, preferentially, saturate the entire membrane by diffusion.

Water may alternatively be supplied to the proton-conducting membrane by a combination of the possibilities described above, for instance from an edge and from the cathodic side simultaneously.

Hydrogen generated at the cathode may be vented directly to the atmosphere. Preferably a vent or vent means of a pre-determined shape and dimensions is provided such that the rate of hydrogen generation at the cathode produces a hydrogen flow through the vent, which is sufficient to prevent the substantial inflow of atmospheric oxygen through the vent. As described above, if oxygen contacts the cathode during electrolysis it may be ionised and disadvantageously form hydrogen peroxide. The required shape and dimensions of the vent to prevent substantial in-flow of air or atmospheric oxygen will depend upon the volume and rate of hydrogen produced by the generator. The volume of hydrogen produced in a given time may depend on a number of factors such as applied voltage, area of membrane and volume of membrane.

The vent or vent means may comprise one or more vents, or may comprise a gas-permeable membrane through which the hydrogen flows or diffuses. The vent or vent means may also, or alternatively, comprise one or more one-way valves.

Optionally, the hydrogen may flow into a cathode chamber before being vented to the atmosphere from the cathode chamber.

Hydrogen generated at the cathode may advantageously flow or diffuse away from the cathode through a gas-permeable membrane. Such a membrane may act as, or form part of, the vent or vent means and may advantageously prevent ingress of contaminants such as dust and/or liquid to the cathode and the proton-conducting membrane. Advantageously, such a gas-permeable membrane may be arranged either in contact with the cathode or spaced from the cathode.

Advantageously, hydrogen generated at the cathode may be used, for example as a standard gas supply for calibration.

In a further aspect of the invention, the oxygen-generation apparatus may comprise an oxidation catalyst at which hydrogen generated at the cathode reacts with atmospheric oxygen.

Advantageously, oxygen in the atmosphere may be prevented from reaching the cathode by the chemical reaction at the oxidation catalyst with the cathodically-generated hydrogen. The presence of the oxidation catalyst may also advantageously reduce or eliminate the volume of hydrogen vented to the atmosphere.

In certain circumstances, particularly where volumes of hydrogen generated are high, if the hydrogen is vented to the atmosphere it may concentrate in the region of the oxygen generator and form a potential explosion risk.

A generator in which the volume of hydrogen vented to the atmosphere is reduced or is eliminated may therefore pose less of a safety risk than one that does vent hydrogen to the atmosphere (that is one in which provision is not made to reduce or eliminate hydrogen venting).

The oxidation catalyst may comprise any material that catalyses the reaction between hydrogen and oxygen. A particularly efficacious catalyst is platinum. Platinum may be present for example in the form of a foil or as a sputtered coating or as platinum particles loaded into a matrix, such as a carbon matrix.

Preferably the product of the reaction between hydrogen and atmospheric oxygen at the oxidation catalyst is water. Advantageously, such water may be returned to a source of water for supplying water to the proton-conducting membrane or returned directly to the proton-conducting membrane itself. Water consumed during electrolysis may thereby be replenished by water formed by the reaction of electrolytically-produced hydrogen and atmospheric oxygen at the oxidation catalyst.

In one aspect, the invention provides a water-recycling apparatus for an oxygen generator, comprising an oxidation catalyst as described.

The water-recycling apparatus may be positioned either adjacent to or spaced from the cathode at which hydrogen is produced.

In one embodiment, a gas-end-liquid-permeable membrane separates the oxidation catalyst from the cathode. Hydrogen generated at the cathode may advantageously pass through the membrane to reach the oxidation catalyst. Water generated at the catalyst, or a proportion of the water, may then pass from the catalyst back through the membrane to the cathode and the proton-conducting membrane.

Atmospheric oxygen may advantageously flow through a gas-permeable/liquid-impermeable membrane to reach the oxidation catalyst. This may prevent water generated at the catalyst from flowing or diffusing to the atmosphere and being lost from the oxygen-generation apparatus.

In a further aspect the invention also provides a method of generating oxygen by electrolysis of water, in which water is supplied to a proton-conducting membrane and electrolysed to generate oxygen at an anode and hydrogen at a cathode, and atmospheric oxygen is substantially prevented from contacting the cathode.

Two advantageous ways of preventing access of atmospheric oxygen to the cathode, namely venting of hydrogen produced at the cathode through a vent or restriction or vent means of predetermined shape and dimensions, and reaction of hydrogen with atmospheric oxygen at a catalyst, have already been described above.

Advantageously, oxygen may be produced using a generation apparatus or method according to the invention in a sufficient volume for supplying to a wound or sore of a patient for therapeutic purposes. Preferably oxygen can be produced at a rate of between 1 and 20 ml per hour. Particularly preferably oxygen may be produced at a rate of about 15 ml per hour. Advantageously, oxygen may be produced at a pressure of about 50 mbar above atmospheric pressure. The flow of oxygen from the apparatus may be fixed, or advantageously the flow of oxygen may be variable, for instance by varying the electrolysis current. This may conveniently be controlled, for example, by a suitably programmed electronic controller. A variable oxygen flow may allow a physician to maintain an optimum oxygen flow to a wound during the healing process.

It is noted above that in a preferred embodiment oxygen may be produced at about 50 mbar above atmospheric pressure. In more general terms, a cathodic chamber of an oxygen generator embodying the invention may operate at a different pressure from an anode chamber. For example, if the anode chamber is at atmospheric pressure, the cathode chamber may operate at an elevated pressure. If the oxygen generator is used to produce oxygen for treating wounds, the elevated pressure output may advantageously be employed with a suitably-designed dressing to help remove exudate from a wound.

Advantageously, oxygen formed by the electrolysis of water according to the invention may substantially avoid the production of hydrogen peroxide and may thus be suitable for therapeutic use.

Advantageously, an oxygen-generation apparatus embodying the invention may operate continuously. This may allow oxygen to be supplied to a wound 24 hours a day for a predetermined period, for example for seven days.

Advantageously, an oxygen generator embodying the invention may be designed for use in any orientation. This may enhance portability of the oxygen generator.

In this document reference is made to the generation of oxygen, for example in the terms "oxygen-generation apparatus" and "method of generating oxygen". As the skilled person would readily appreciate, the output of such an apparatus or method need not be pure oxygen, and these terms should be construed accordingly, for example to encompass oxygen concentration. Thus, for example, the output of an oxygen generator may comprise oxygen at a concentration greater than that of oxygen in the environment of the oxygen generator.

DESCRIPTION OF SPECIFIC EMBODIMENTS

Specific embodiments of the invention will now be described by way of example, with reference to the drawings, in which.

Figure 1:
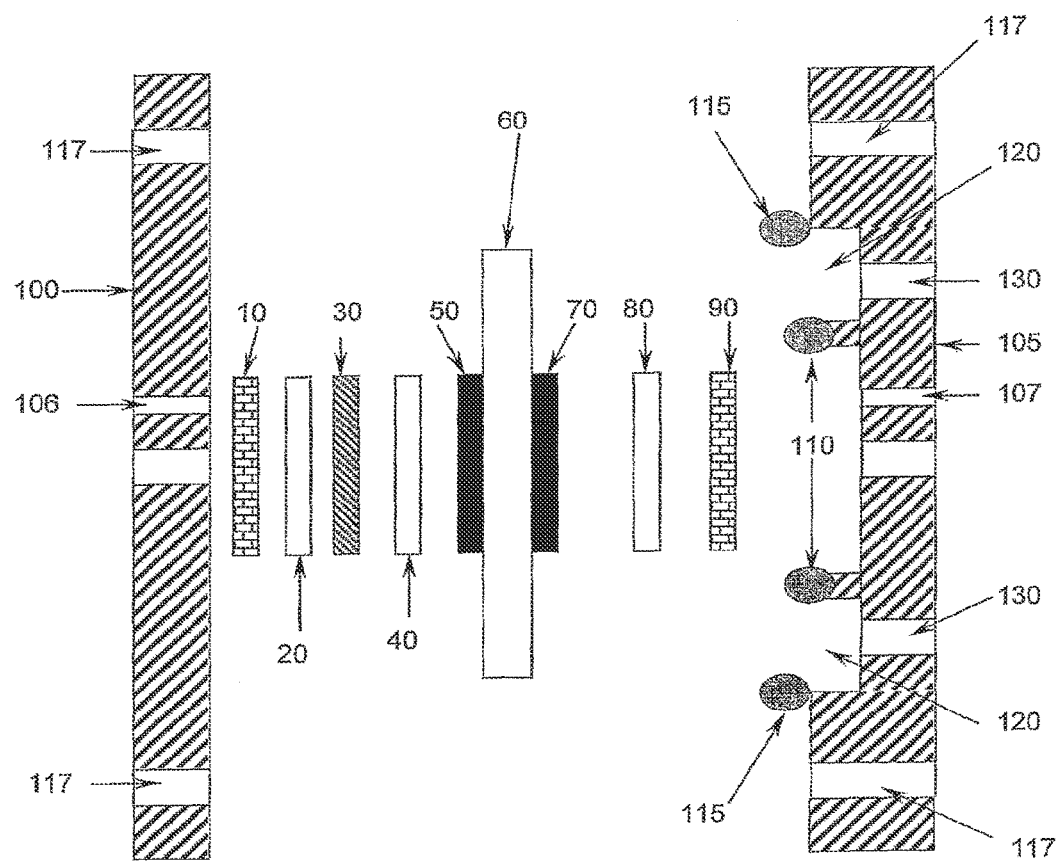
FIG. 1 shows an exploded cross-sectional view of an oxygen generator according to a first embodiment of the invention.

An oxygen generator for an oxygen generation apparatus according to a first embodiment of the invention will now be described with reference to FIGS. 1, 2, 3, and 4. The generator comprises a first end-plate 100 and a second end-plate 105, between which various layers of materials are sandwiched. These layers are, in order starting with the layer immediately adjacent the first end-plate, a first separator 10; a first gas-permeable/liquid-impermeable membrane 20; an oxidation catalyst 30; a gas-permeable/liquid-permeable membrane 40; a porous cathode 50; a proton exchange membrane (PEM) 60; a porous anode 70; a second gas-permeable/liquid-impermeable membrane 80; and a second separator 90, the second separator being disposed immediately adjacent the second end-plate. When the apparatus is assembled, as illustrated in FIG. 2, all of these layers are pressed together in close contact with each other.

Figure 4:
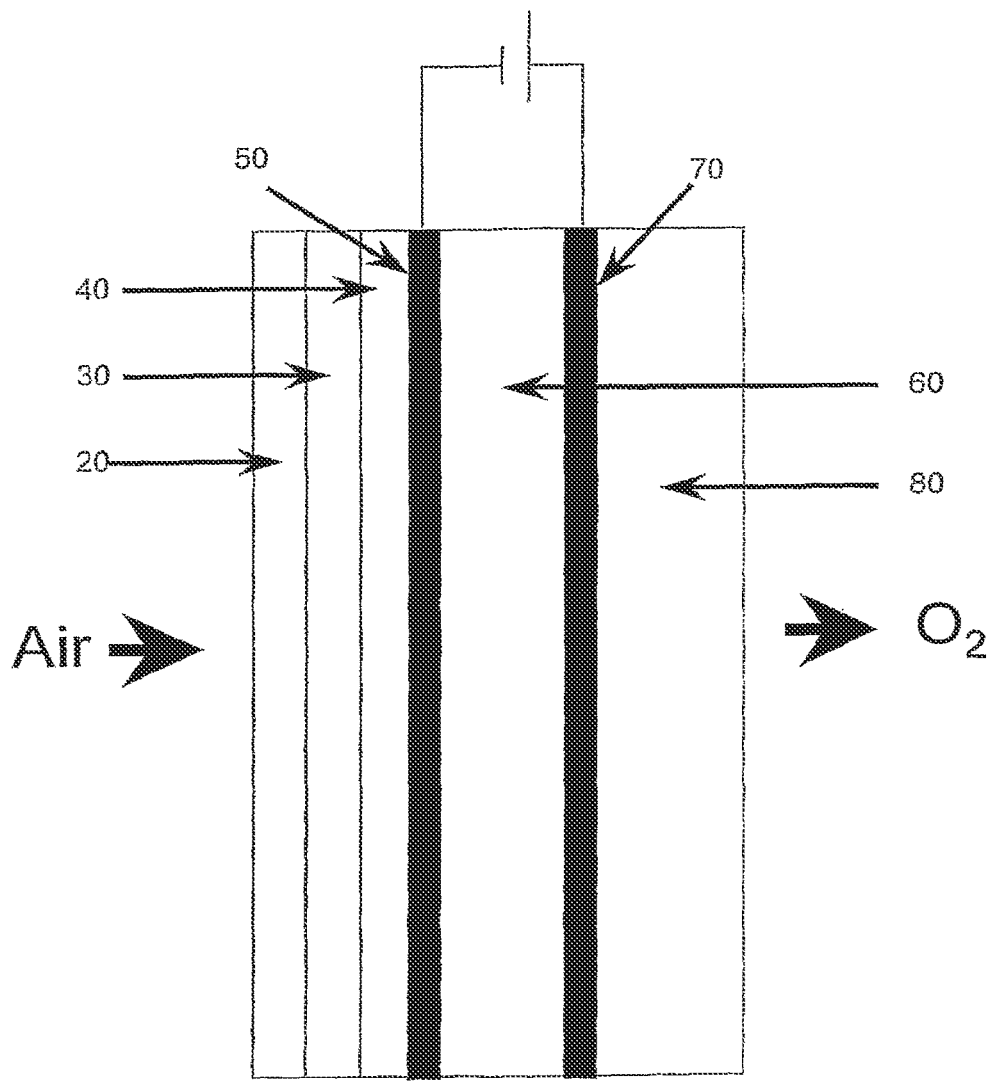
FIG. 4 is a schematic diagram of a membrane electrode assembly for an oxygen generator embodying the invention.

The layered structure consisting of the first gas-permeable/liquid-Impermeable membrane, the oxidation catalyst, the gas-permeable/liquid-permeable membrane, the porous cathode, the PEM, the porous anode, and the second gas-permeable/liquid-impermeable membrane, can be termed a membrane electrode assembly (MEA). FIG. 4 shows the layers in the MEA schematically.

In this embodiment, the end plates are circular, of about 70 mm diameter, and the layers forming the MEA are all of 25 mm diameter, except for the PEM layer which is of larger diameter as described below. The MEA is positioned coaxially between the end plates.

The end-plates are made from polymethylmethacrylate (PMMA). Each is formed with a central hole for receiving an electrode connector 119. The first end-plate has one or more small inlet holes 106 through it, offset from the centre of the end plate but opening onto the MEA, to allow inflow of air to a first, cathodic, side of the MEA. The second end-plate has a similarly-offset small vent hole 107 to vent oxygen liberated at a second, anodic, side of the MEA from the apparatus. The second end plate also has two water channels 130 which allow water to be charged to an annular water compartment 125, which encircles the MEA.

When assembled, the two end-plates are separated by inner and outer o-rings 110 and 115 positioned coaxially between the end plates. The o-rings are made of rubber in the embodiment but could be made from any other suitable corrosion-resistant flexible material used for sealing. The water compartment 125 is formed by a space bounded by the two end-plates, the inner o-ring and the outer o-ring. An annular recess 120 in the second end-plate between the o-rings allows a greater volume of water to be held within the compartment than would be achievable without it. Water can be fed into, or removed from, the compartment through the water channels.

The first and second separators are 25 mm discs of gas-permeable corrosion-resistant metal mesh. The separators are electrical conductors and are coupled to a power supply by means of the electrode connectors 119. Each connector is a bolt that passes through a hole in the centre of the first or second separator and through the central hole in the first or second end-plate. A washer and a nut are placed on the end of each bolt extending from each end plate, thereby clasping each separator to its end-plate and forming a good electrical contact with the separator. The washers maintain a gas-tight seal of the hole through each end-plate, and good electrical connections can be made of the end of each bolt extending from each end plate.

The first gas-permeable/liquid-impermeable membrane is made from a 25 mm disc of a hydrophobic carbon-fibre paper containing PTFE.

The gas-permeable/liquid-permeable membrane is made from a 25 mm disc of an electrically-conducting PTFE-impregnated carbon cloth with low hydrophobicity, loaded on one side with Pt. The low hydrophobicity of this layer means that it is permeable to both liquids and gases.

The Pt-coating or layer on the surface of the gas-permeable/liquid-permeable membrane faces the first gas-permeable/liquid-Impermeable membrane and forms the oxidation catalyst layer.

The PEM layer is an approximately 48 mm diameter disc of Nafion® sheet with a dry thickness of 40 micrometers. Nafion® is a commercially-available proton-conducting membrane known in fuel-cell technology, and acts as an electrolyte in the apparatus.

A central circular portion of the Nafion® membrane (a portion of approximately 25 mm diameter), which will in the assembled oxygen generator form part of the MEA, is sputter coated with Pt on each side through an aluminium pattern or mask to form the porous cathode and anode layers. Platinum is electrically conductive and also acts as a catalyst for reactions at the respective electrodes.

When assembled, an outer portion of the PEM 45 extends radially outwards, between the inner o-ring and the first end plate, into the water compartment and, in use, supplies water by diffusion to the central portion of the PEM 46.

Thus, the outer portion of the PEM acts as a wick supplying water by diffusion in the membrane to the central portion of the PEM, which is disposed between the anode and the cathode.

The second gas-permeable/liquid-impermeable membrane is made from a 25 mm diameter disc of an electrically-conducting polytetrafluorethylene (PTFE)-impregnated carbon cloth with high hydrophobicity, loaded on one side with Pt. The Pt-coated surface of the membrane faces towards the anode and the PEM.

The end plates are fastened together using bolts 118, which pass through bolt-holes 117 near the radially-outer edges of the end-plates. The bolts are fastened tightly enough to compress the o-rings between the two end-plates and hold the MEA firmly between the separators.

The separators and all the layers in the MEA apart from the PEM are electrical (electronic) conductors. The PEM is an ion conductor, however. Nuts threaded onto the threaded rods forming the electrode connectors 119 fasten the first and second separators to their respective end-plates and also retain leads for electrically coupling the anode and cathode, via the various conducting layers of the MEA, to a 4.5 V 1.7 Ah lithium metal-hydride battery.

Figure 2:
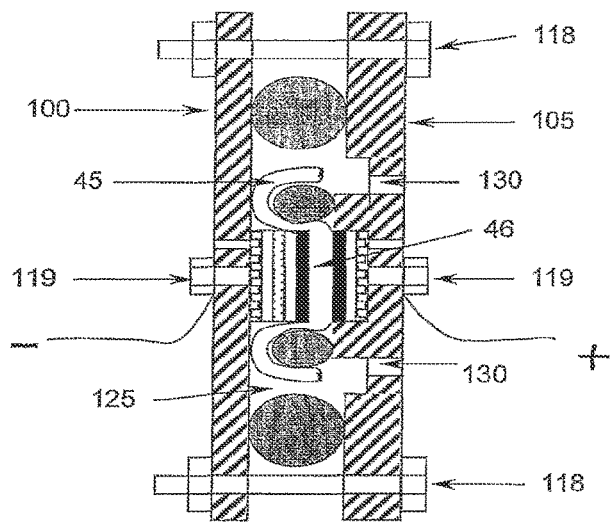
FIG. 2 shows a cross-section of an assembled oxygen generator according to the first embodiment.
Figure 3:
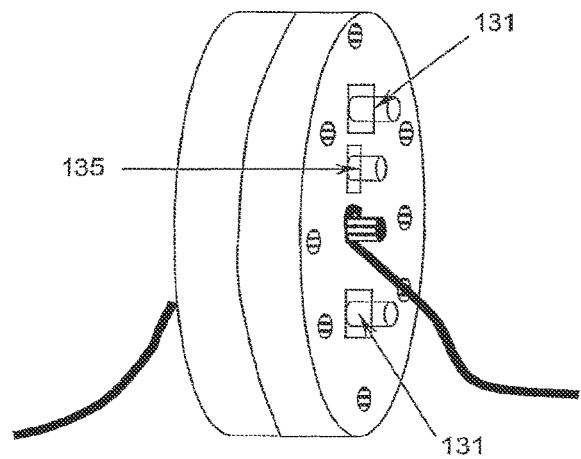
FIG. 3 shows an external perspective view of an assembled oxygen generator showing electrical connections, water feeding holes and oxygen gas outlet.

FIG. 3 is a perspective view of the assembled generator of FIG. 2 and shows portions of water feed pipes 131 feeding the water channels and an oxygen vent pipe 135 attached to the vent hole in the second end-plate.

To generate oxygen, water is charged to the water compartment through the water channels and the compartment is then sealed. The outer portion of the PEM, disposed in the water compartment, absorbs water and the central portion of the PEM becomes saturated with water by diffusion. This embodiment has a central portion of area approximately 5 cm² (in the form of the disc of about 25 mm diameter) of proton-conducting membrane structure, and can contain approximately 5 ml of water.

When a potential is applied between the cathode and the anode, water within the central portion of the PEM is electrolysed. In this embodiment, consumption of electricity is approximately 0.14 W, and this can be satisfied by a power source such as a rechargeable lithium metal-hydride battery, allowing about 70 hours between charges. The power source may be a mobile phone battery, a fuel cell or other similar portable power source.

The Pt anode catalyses the electrolytic reaction, $$H_2O = 2H^+ + \frac{1}{2}O_2(\text{pure}) + 2e^-$$

Oxygen gas passes through the second gas-permeable/liquid-impermeable membrane and then through the second separator and out of the generator via the vent hole. Because the second gas-permeable/liquid-impermeable membrane is not permeable to liquid, water within the PEM does not pass through to the vent hole.

Hydrogen ions remain within the PEM and are transported to the cathode. The Pt cathode catalyses the electrolytic reaction, $$2H^{+b} + 2e^- = H_2$$

Hydrogen gas generated at the cathode passes through the gas-permeable/liquid-permeable membrane and reaches the oxidation catalyst. The oxidation catalyst catalyses the chemical reaction between oxygen in atmospheric air (which enters via the inlet hole in the first end-plate and passes through the gas-permeable/liquid-impermeable membrane to reach the oxidation catalyst) and hydrogen generated electrolytically at the cathode.

$$H_2 + \frac{1}{2}O_2(\text{air}) = H_2O$$

This reaction prevents substantial quantities of hydrogen from being vented into the atmosphere. The reaction also prevents substantial quantities of atmospheric oxygen from contacting the cathode, where it could be ionised to form hydrogen peroxide.

Water generated in this chemical reaction passes through the gas-permeable liquid-permeable membrane to the PEM and may thus replenish water consumed by electrolysis in the central portion of the PEM. The gas-permeable/liquid impermeable membrane, the oxidation catalyst and the gas-permeable/liquid permeable membrane thus form a water-recycling apparatus.

The oxygen-generation apparatus according to the first embodiment of the invention may be viewed as an oxygen-concentration device. Dilute oxygen present in air (at a concentration of approximately 21% by volume) is chemically reacted with hydrogen to form water, which is then electrolysed to form pure oxygen. The overall reaction may thus be written:

$$\frac{1}{2}O_2(\text{air}) = \frac{1}{2}O_2(\text{pure})$$

Figure 9:
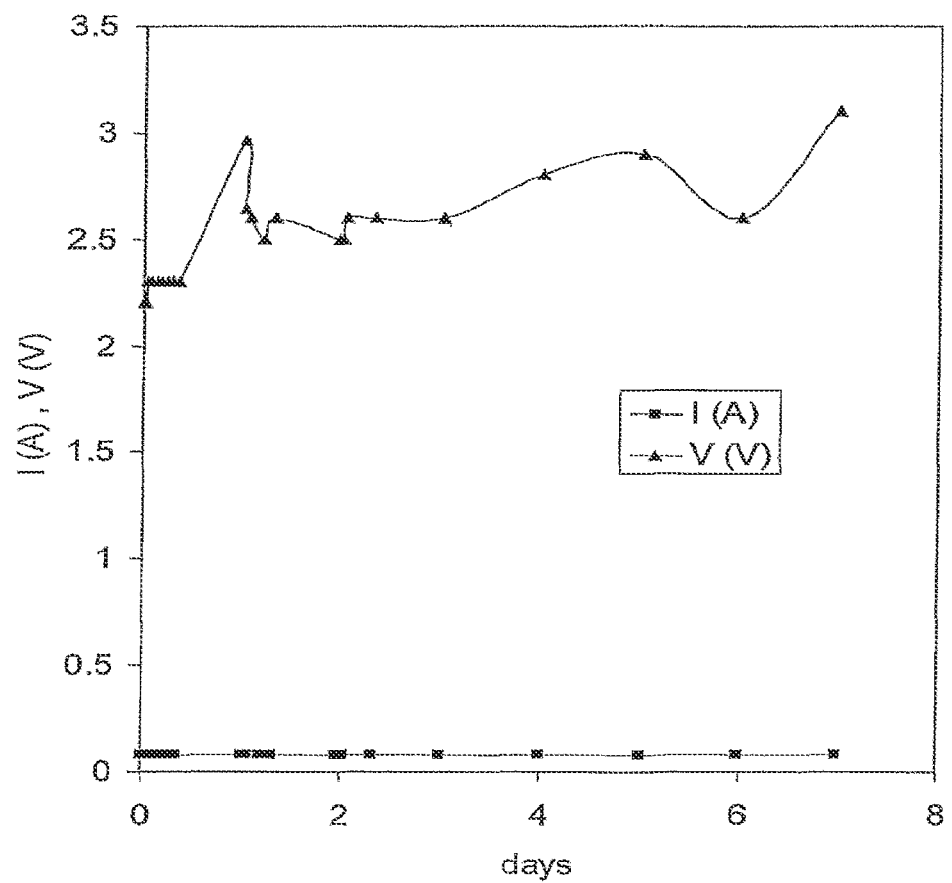
FIG. 9 is a graph showing the stability of the voltage during a current-controlled experiment using an apparatus according to the first embodiment of the invention.

In a 0.08 A current-controlled experiment using the apparatus described above, operating continuously for a period of seven days, a 15 ml/hour oxygen flow was generated and no hydrogen flow out of the apparatus was detected by a hydrogen detector. FIG. 9 shows the stability of the voltage at this fixed current over the period of seven days.

Although in this specific embodiment the oxidation catalyst forms part of the MEA there is no need for it to be so. For example, hydrogen could be generated at the cathode and vented via a tube to a catalyst layer, where it could react with atmospheric oxygen to form water. This water could then be routed back, for example through a further tube or channel, to the PEM or to the water compartment, thus providing a water-recycling apparatus spaced from the PEM. Alternatively, water generated at the oxidation catalyst could simply be discarded. If the water is discarded, the advantages of reducing hydrogen venting and reducing hydrogen peroxide formation may still be achieved. If the water is recycled, then the water consumption of the apparatus may also advantageously be reduced.

Although the electrolytic catalyst/electrode material used at the cathode and the anode is platinum, any suitable catalyst/electrode combination could be used at either the cathode or the anode. A conducting anode, for example made of carbon, could be coated with a layer of a platinum catalyst. A non-platinum electrolytic catalyst could also be used providing it catalyses the respective cathode or anode reactions sufficiently.

In the first embodiment described above the platinum electrodes are deposited on the PEM as sputtered layers. The platinum could equally well be a porous foil sandwiched between the PEM and an outer membrane, or it could be plated onto the PEM or on to one of the membranes on either side of the PEM and then abutted against the PEM. Likewise, the oxidation catalyst could be any catalyst, or catalyst plus support material, that catalyses the chemical reaction between hydrogen and oxygen sufficiently.

The materials used to manufacture the first and second gas-permeable/liquid-impermeable membranes and the gas-permeable/liquid-permeable membrane need not be made from the specific materials identified above. Such membranes can be made from any materials possessing the required properties with respect to gas and liquid permeability. Preferably such membranes are electronically conducting as it is convenient to couple the power supply to the anode and cathode through the various layers in the MEA.

This need not be so, however, and the power supply could be coupled directly to the anode and the cathode allowing the membranes to be made from non-conductive materials.

Typically, the first and second gas-permeable/liquid-impermeable membranes will be conductive and made from any suitable hydrophobic porous cloth, paper or composite (for example plastic composites containing carbon, graphite, carbon nanotubes or some combination thereof).

Typically, the gas-permeable/liquid-permeable membrane will be conductive and made from any suitable hydrophilic porous cloth, paper or composite (for example plastic composites containing carbon, graphite, carbon nanotubes or some combination thereof).

Although the MEA of the first embodiment described above effectively forms a disc of approximately 25 mm diameter it is clear that the MEA need not be disc-shaped. Square or any other shape MEAs may also be effective. In the above example the effective area of the MEA is approximately 5 $cm^2$. The effective area of MEA may be smaller than 5 $cm^2$, for instance 3 $cm^2$ or 1 $cm^2$. Likewise the effective area of MEA may be greater than 5 $cm^2$, for example 8 $cm^2$ or 10 $cm^2$. To change the effective area of the MEA (for a circular MEA) the diameter of the various layers in the MEA could be increased or decreased for instance down to 20 mm or 15 mm or 10 mm diameter or up to 30 mm or 35 mm or 40 mm diameter. In the above example where the water is supplied to the central portion of the PEM by diffusion from a water supply in contact with the outer portion of the PEM, an upper limit on the dimensions of the MEA may be set by the maximum distance that water can diffuse through the PEM from the outer portion. Such a dimension may be dependent on the material properties and thickness of the particular PEM used, and on the shape of the MEA and the shape of the water reservoir or compartment.

Figure 5:
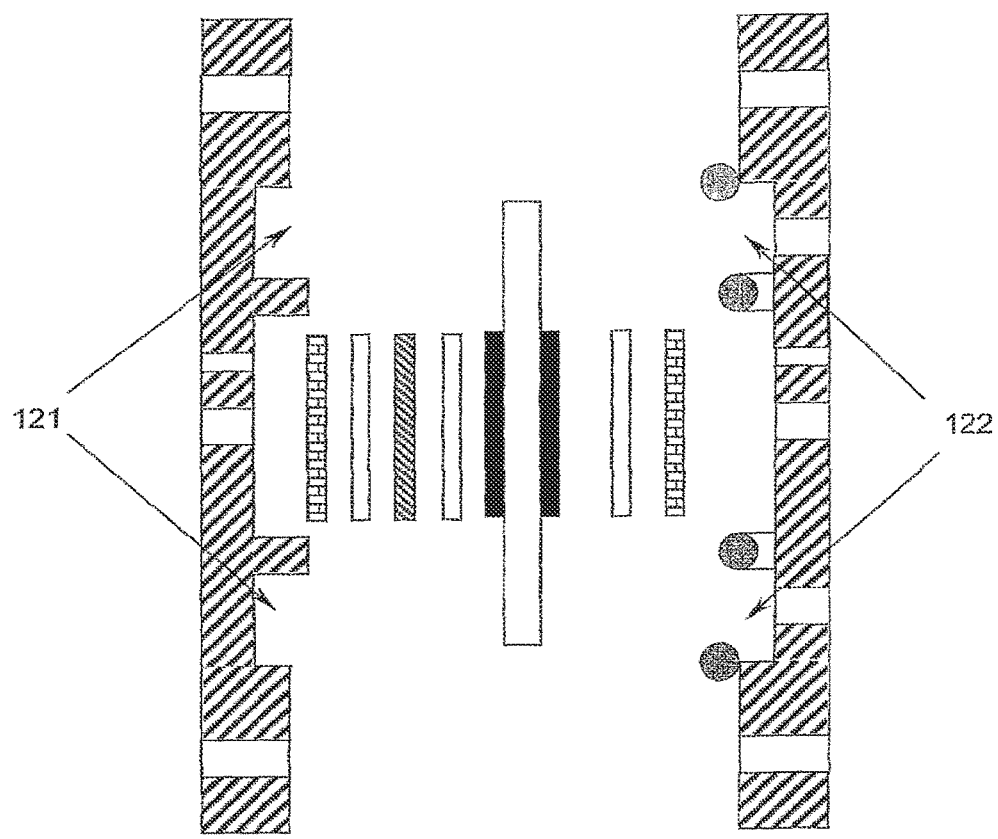
FIG. 5 shows an exploded cross-sectional view of an oxygen generator according to a second embodiment of the invention.

The construction of an apparatus according to the invention need not involve a generator identical to that shown in FIG. 1. A second embodiment of an oxygen generator according to the invention is shown in FIG. 5. The water compartment is formed by annular recesses in both end-plates 121 and 122 and thus has a volume approximately double that of the water compartment described in relation to the first embodiment above. The increased volume of the water compartment in the second embodiment may advantageously increase the operational time of the device. The MEA structure in the second embodiment is as described for the first embodiment.

Figure 6:
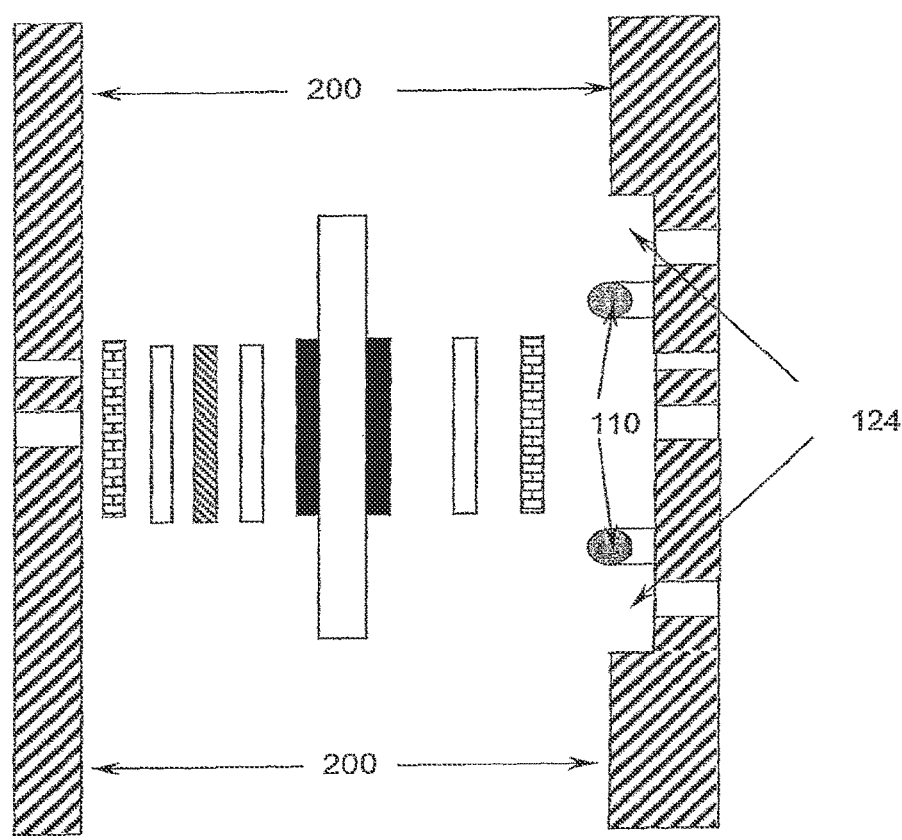
FIG. 6 shows an exploded cross-sectional view of an oxygen generator according to a third embodiment of the invention.

A third embodiment of an oxygen generator according to the invention is illustrated in FIG. 6, where the two end-plates are bonded together with an adhesive at a portion of their surface 200. This embodiment only requires the use of a single o-ring 110 and the water compartment is formed by an annular cavity 124 bounded by the o-ring, the two end-plates and the adhesive bond. The adhesive may be reactively cured, UV cured, thermoplastic or solvent based. The adhesive may be a cyanoacrylate, a silicone, a polyurethane, an epoxy, or any other kind of adhesive. The MEA structure in the third embodiment is as described for the first embodiment.

Although reacting atmospheric oxygen with hydrogen evolved from the cathode is an advantageous method of preventing substantial quantities of atmospheric oxygen contacting an interface with the cathode and the PEM, there are alternative methods of preventing this.

Figure 7:
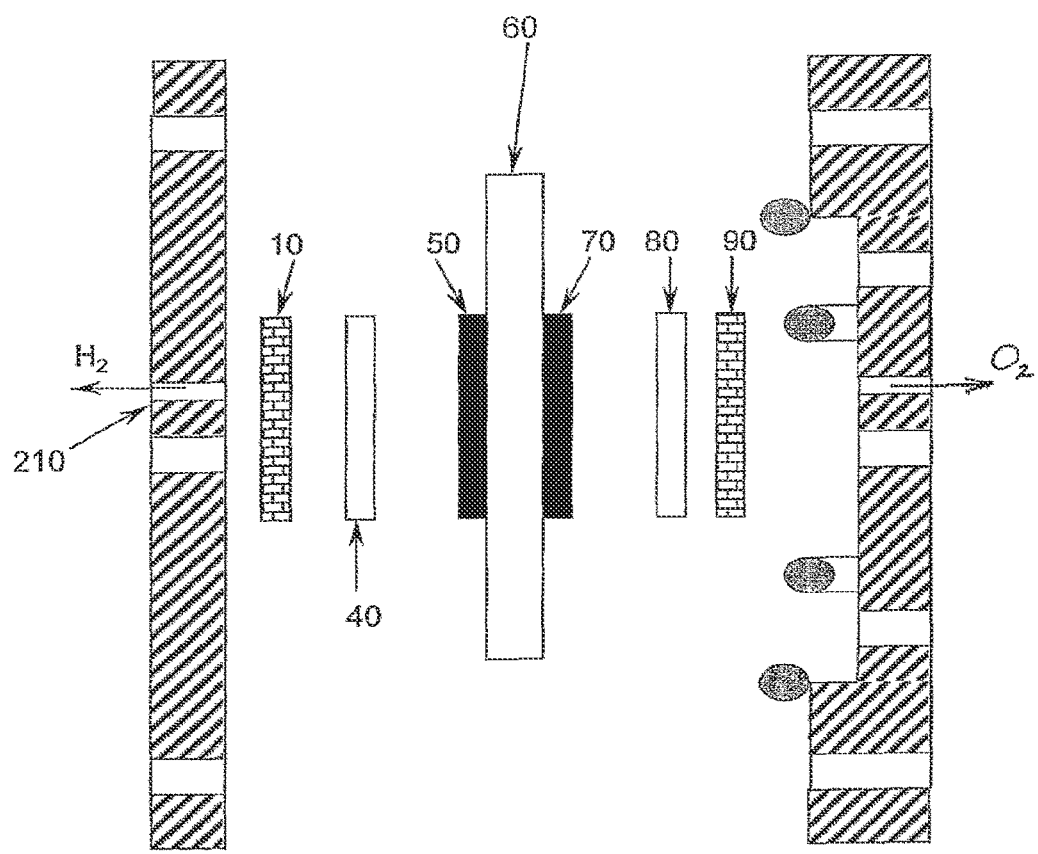
FIG. 7 shows an exploded cross-sectional view of an oxygen generator according to a fourth embodiment of the invention.

In a fourth embodiment illustrated in FIG. 7 the oxygen-generation apparatus does not catalyse the reaction between hydrogen and atmospheric oxygen to form water. In this embodiment, the MEA does not include an oxidation catalyst layer or a first gas-permeable/liquid-impermeable membrane as described in the first embodiment, but does comprise a stack of layers sandwiched between first and second separators 10, 90 and consisting of a first gas-permeable/liquid-impermeable membrane 42, a porous cathode 50, a proton-conducting polymer membrane (PEM) 60, a porous anode 70, and a second gas-permeable/liquid-impermeable membrane 80. Hydrogen generated at the cathode passes through the first gas-permeable/liquid-impermeable membrane and is vented to the atmosphere via a hydrogen vent 210 formed through a first end-plate of the apparatus. The diameter and length of the hydrogen vent are predetermined such that the flow of vented hydrogen is sufficient to prevent substantial influx of air. In an alternative embodiment, the vent may be coupled to a vent tube of predetermined shape and dimension or to a one-way valve such that substantial influx of air is avoided.

The first gas-permeable/liquid-impermeable membrane may, if its properties are suitably selected or predetermined, be sufficient to prevent atmospheric oxygen from reaching the cathode while hydrogen is passing through the membrane away from the cathode, and so avoid the need for (or effectively replace) the vent of predetermined shape and dimensions. Such a membrane may also advantageously prevent atmospheric contaminants such as dirt or chemical contaminants from reaching the cathode and damaging the apparatus.

In the fourth embodiment the water in the compartment is not replenished by means of a chemical reaction and therefore an oxygen generator designed with a larger water compartment, such as that described in the third embodiment (FIG. 5), may advantageously have a longer running life before the need to recharge the supply.

Figure 8:
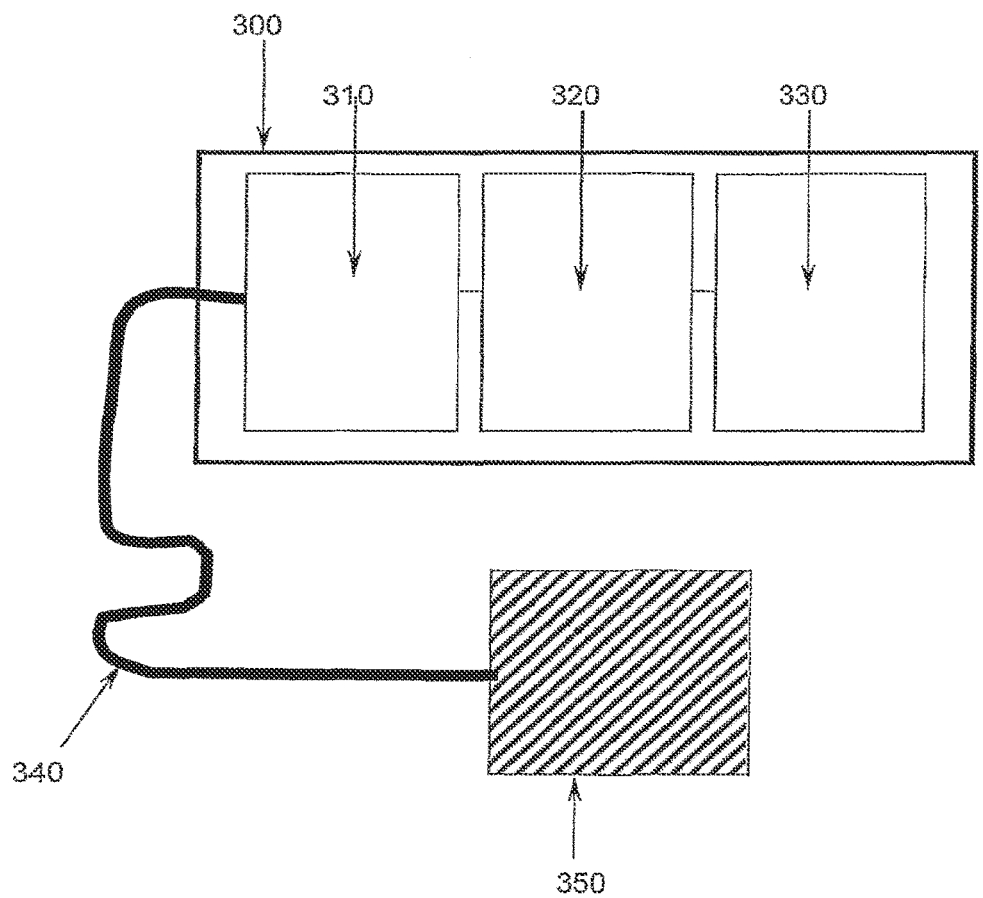
FIG. 8 is a schematic illustration of an oxygen generation apparatus comprising an oxygen generator, an electrical circuit, and a power supply encapsulated in an ergonomic box.

As illustrated in FIG. 8, the oxygen generator of any of the embodiments described above 310 may be connected though an electrical circuit 320 to a power supply 330 and encapsulated in an ergonomic box 300. Pure oxygen may then be vented from the box via flexible plastic tubing 340, which may be used to deliver the oxygen to a sterile dressing 350 fixed to a wound. The box may have a means for fixing to a belt or a pocket, so that the oxygen-generation apparatus can be worn, and may be made of a light-weight durable plastic material, such as polyethylene, polypropylene, vinyl, nylon, rubber, leather, various impregnated or laminated fibrous materials, various plasticized materials, cardboard, impregnated paper, etc.

Preferably, the box is portable and may allow a patient unrestricted mobility while wearing the complete oxygen-generation apparatus.

The invention claimed is:

1. A method of generating oxygen comprising:
   electrolysing water supplied to a proton-conducting membrane, the proton-conducting membrane being in contact with an anode on one side and a cathode on the other side, to generate oxygen at the anode and hydrogen at the cathode; and
   recycling the generated hydrogen by reaction of the generated hydrogen with atmospheric oxygen at an oxidation catalyst adjacent to the cathode to produce water,
   wherein, the generated hydrogen passes from the cathode through a gas-and-liquid permeable membrane sandwiched between the cathode and the oxidation catalyst, and wherein water produced at the oxidation catalyst passes through the gas-and-liquid-permeable membrane to the proton-conducting membrane such that the proton-conducting membrane, the anode, the cathode, the oxidation catalyst and the gas-and-liquid permeable membrane are in the form of layers.

2. The method of generating oxygen of claim 1, wherein the proton-conducting membrane, the cathode, the anode, the oxidation catalyst and the gas-and-liquid-permeable membrane are retained between two end plates, the endplates being coupled together forming a watertight seal therebetween and, wherein the atmospheric oxygen has access to the oxidation catalyst through one or more inlets defined in one of the end plates.

3. The method of generating oxygen of claim 1, wherein the layers are pressed together.

4. The method of generating oxygen of claim 3, wherein the atmospheric oxygen flows through a gas-permeable corrosion-resistant metal separator, adjacent to the oxidation catalyst, to reach the oxidation catalyst and the gas-permeable corrosion-resistant metal separator is in the form of a layer pressed together with the layers pressed together.

5. The method of generating oxygen of claim 1, wherein the gas-and-liquid-permeable membrane is electrically conductive, and the method further comprising the step of applying an electrolysis voltage to the cathode through the gas-and-liquid-permeable membrane.

6. The method of generating oxygen of claim 1, wherein the atmospheric oxygen flows through a gas-permeable corrosion-resistant metal separator, adjacent to the oxidation catalyst, to reach the oxidation catalyst and the gas-permeable corrosion-resistant metal separator and the gas-and-liquid permeable membrane are electrically conductive, and the method further comprising the step of applying an electrolysis voltage to the cathode through the gas-permeable corrosion-resistant metal separator and the gas-and-liquid permeable membrane.

7. The method of generating oxygen of claim 1, wherein the step of recycling the generated hydrogen by reaction with atmospheric oxygen at the oxidation catalyst substantially prevents the formation of hydrogen peroxide at the cathode.

8. The method of generating oxygen of claim 1, wherein oxygen is generated at a rate of between 1 and 20 ml per hour.

9. An oxygen-generation apparatus comprising:
a proton-conducting membrane;
a cathode contacting a first side of the proton-conducting membrane;
an anode contacting a second side of the proton-conducting membrane;
an oxidation catalyst adjacent to the cathode; and
a gas-and-liquid-permeable membrane sandwiched between the oxidation catalyst and the cathode,
wherein the proton-conducting membrane, the cathode, the anode, the oxidation catalyst and the gas-and-liquid-permeable membrane are in the form of layers; and
wherein, during operation of the oxygen generation apparatus:
electrolysis of water supplied to the proton-conducting membrane generates oxygen at the anode and hydrogen at the cathode;
the generated hydrogen passes from the cathode through the gas- and -liquid permeable membrane and reacts with atmospheric oxygen at the oxidation catalyst to produce water; and
the produced water passes through the gas-and-liquid-permeable membrane to the proton-conducting membrane.

10. The oxygen-generation apparatus of claim 9, wherein the oxygen-generation apparatus further comprises a gas-permeable corrosion-resistant metal separator adjacent to the oxidation catalyst.

11. The oxygen-generation apparatus of claim 9, wherein the proton-conducting membrane, the cathode, the anode, the oxidation catalyst and the gas-and-liquid-permeable membrane are retained between two end plates, the endplates being coupled together forming a watertight seal therebetween and, wherein one of the end plates defines one or more inlets enabling access of the atmospheric oxygen to the oxidation catalyst.

12. The oxygen-generation apparatus of claim 9, wherein the layers are pressed together.

13. The oxygen-generation apparatus of claim 12, wherein the oxygen-generation apparatus further comprises a gas-permeable corrosion-resistant metal separator, adjacent to the oxidation catalyst, wherein the gas-permeable corrosion-resistant metal separator is in the form of a layer pressed together with the layers pressed together.

14. The oxygen-generation apparatus of claim 9, wherein the gas-and-liquid-permeable membrane is electrically conductive and is in electrical contact with the cathode.

15. The oxygen-generation apparatus of claim 9, wherein the oxygen-generation apparatus further comprises a gas-permeable corrosion-resistant metal separator, adjacent to the oxidation catalyst and, wherein the gas-permeable corrosion-resistant metal separator and the gas-and-liquid permeable membrane are electrically conductive and in electrical contact with the cathode.

* * * * *